United States Patent
Kawai et al.

(10) Patent No.: US 11,264,884 B2
(45) Date of Patent: Mar. 1, 2022

(54) VEHICLE LINEAR MOTOR

(71) Applicant: HITACHI AUTOMOTIVE SYSTEMS, LTD., Ibaraki (JP)

(72) Inventors: Yoshinori Kawai, Ebina (JP); Kan Kobayashi, Yokohama (JP); Hiroshi Chikuma, Matsudo (JP); Aya Mizukoshi, Yokohama (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 432 days.

(21) Appl. No.: 16/087,840

(22) PCT Filed: May 23, 2017

(86) PCT No.: PCT/JP2017/019226
§ 371 (c)(1),
(2) Date: Sep. 24, 2018

(87) PCT Pub. No.: WO2017/204220
PCT Pub. Date: Nov. 30, 2017

(65) Prior Publication Data
US 2019/0149029 A1    May 16, 2019

(30) Foreign Application Priority Data
May 26, 2016    (JP) .............................. JP2016-105121

(51) Int. Cl.
*F04B 35/04* (2006.01)
*B60K 1/00* (2006.01)
(Continued)

(52) U.S. Cl.
CPC ............... *H02K 55/02* (2013.01); *B60K 1/00* (2013.01); *F04B 35/04* (2013.01); *F04B 35/045* (2013.01);
(Continued)

(58) Field of Classification Search
None
See application file for complete search history.

(56) References Cited

U.S. PATENT DOCUMENTS 5,600,953 A * 2/1997 Oshita ................ B60G 17/0523
60/453
8,177,523 B2 * 5/2012 Patel ..................... F04B 35/045
417/360

FOREIGN PATENT DOCUMENTS

JP    5-66187    8/1993
JP    2008-37183    2/2008
(Continued)

OTHER PUBLICATIONS

Machine translation of Ishida et al. JP2011240731, retrieved from "https://translationportal.epo.org/" (Year: 2021).*
(Continued)

*Primary Examiner* — Peter J Bertheaud
*Assistant Examiner* — Geoffrey S Lee
(74) *Attorney, Agent, or Firm* — Wenderoth, Lind & Ponack, L.L.P.

(57) ABSTRACT

A vehicle linear motor includes: a tubular casing; a pair of armatures placed and fixed in the casing; a mover formed in a flat plate shape and placed to face the pair of armatures and to be movable in the casing; and a support member configured to slidably support the mover such that the mover moves in a longitudinal direction of the mover. The mover formed in the flat plate shape includes a plurality of magnets that are arranged at intervals in the longitudinal direction. Each of the pair of armatures has a magnetic pole that is arranged to move the mover relative to the armatures in the longitudinal direction. The casing is mounted on a vehicle such that the longitudinal direction is a horizontal direction, (Continued)

and the mover and the armatures are placed to face each other in the horizontal direction.

6 Claims, 6 Drawing Sheets

(51) Int. Cl.
| | |
|---|---|
| H02K 5/24 | (2006.01) |
| H02K 9/26 | (2006.01) |
| B60G 17/015 | (2006.01) |
| H02K 55/02 | (2006.01) |
| H02K 33/16 | (2006.01) |
| H02K 41/03 | (2006.01) |
| F04B 35/00 | (2006.01) |
| B60K 17/34 | (2006.01) |
| B60L 1/00 | (2006.01) |

(52) U.S. Cl.
CPC ............... *H02K 5/24* (2013.01); *H02K 9/26* (2013.01); *H02K 33/16* (2013.01); *H02K 41/03* (2013.01); *B60G 17/0155* (2013.01); *B60G 2202/152* (2013.01); *B60K 17/34* (2013.01); *B60L 1/003* (2013.01); *F04B 35/006* (2013.01)

(56) References Cited

FOREIGN PATENT DOCUMENTS

| | | |
|---|---|---|
| JP | 2011-240731 | 12/2011 |
| JP | 2011240731 A * | 12/2011 |

OTHER PUBLICATIONS

International Search Report dated Aug. 22, 2017 in International (PCT) Application No. PCT/JP2017/019226.

* cited by examiner

VEHICLE LINEAR MOTOR

CROSS-REFERENCE TO RELATED APPLICATION

The present application claims priority to Japanese Patent Application No. 2016-105121 filed on May 26, 2016. The entire disclosure including the specification, the claims, the drawings, and the abstract of Japanese Patent Application No. 2016-105121 filed on May 26, 2016 is incorporated herein by reference in its entirety.

TECHNICAL FIELD

The present invention relates to a vehicle linear motor that is mounted on a vehicle such as a four-wheeled vehicle and that is suitably used as a driving source of, for example, a compressor.

BACKGROUND ART

It is known that a vehicle linear motor mounted on a vehicle such as a four-wheeled vehicle is used as a driving source of a refrigerating machine provided to cool down coils of a superconducting motor (as described in, for example, JP 2011-240731A). This refrigerating machine is configured such that a piston of a compressor used to compress a coolant is driven by a linear motor. The linear motor moves a mover relative to armatures formed from, for example, stator coils, so as to drive the piston of the compressor.

SUMMARY

Technical Problem

Vibrations generated in the vehicle include, for example, vibration in a vertical direction and vibration in a left-right direction or in a front-rear direction. Out of them, the vibration in the vertical direction, i.e., vertical acceleration, is the largest vibration. The conventional linear motor is accordingly mounted on the vehicle to be horizontal to the vehicle (for example, to be laid horizontally), in order to avoid the moving direction of the mover from being aligned with the vibrating direction of the vehicle (i.e., the vertical direction) and thereby suppress the occurrence of excessive vibration caused by resonance.

When the mover of the linear motor is formed as a flat plate body extended in a flat plate shape, however, the flat plate mover may be arranged to be opposed to the armatures in the vertical direction in the horizontally laid linear motor. Transmission of the vibration in the vertical direction of the vehicle to the linear motor causes the mover and the armatures, which are opposed to each other in the vertical direction, to become closer to each other and farther away from each other and is likely to reduce the durability and the life duration of support members (bearings) provided between the armatures and the mover.

An object of the present invention is to provide a vehicle linear motor that suppresses an effect of vibration in a vertical direction of a vehicle and improves the durability and the life duration.

Solution to Problem

According to one embodiment of the present invention, there is provided a vehicle linear motor including: a tubular casing; a pair of armatures placed and fixed in the casing; a mover formed in a flat plate shape and placed to face the pair of armatures and to be movable in the casing; and a support member configured to slidably support the mover such that the mover moves in a longitudinal direction of the mover. The mover formed in the flat plate shape includes a plurality of magnets that are arranged at intervals in the longitudinal direction. Each of the pair of armatures includes a magnetic pole that is arranged to move the mover relative to the armatures in the longitudinal direction. The casing is mounted on a vehicle such that the longitudinal direction is a horizontal direction, and the mover and the armatures are placed to face each other in the horizontal direction.

Even when vibration in a vertical direction of the vehicle is transmitted to the linear motor, the configuration of this embodiment of the present invention suppresses the mover and the armatures from vibrating to become closer to each other and farther away from each other and thereby improves the durability and the life duration.

DESCRIPTION OF EMBODIMENTS

The following describes in detail a vehicle linear motor configured as a linear motor compressor according to an embodiment of the present invention, with reference to the accompanied drawings of FIGS. 1 to 6.

Figure 1:
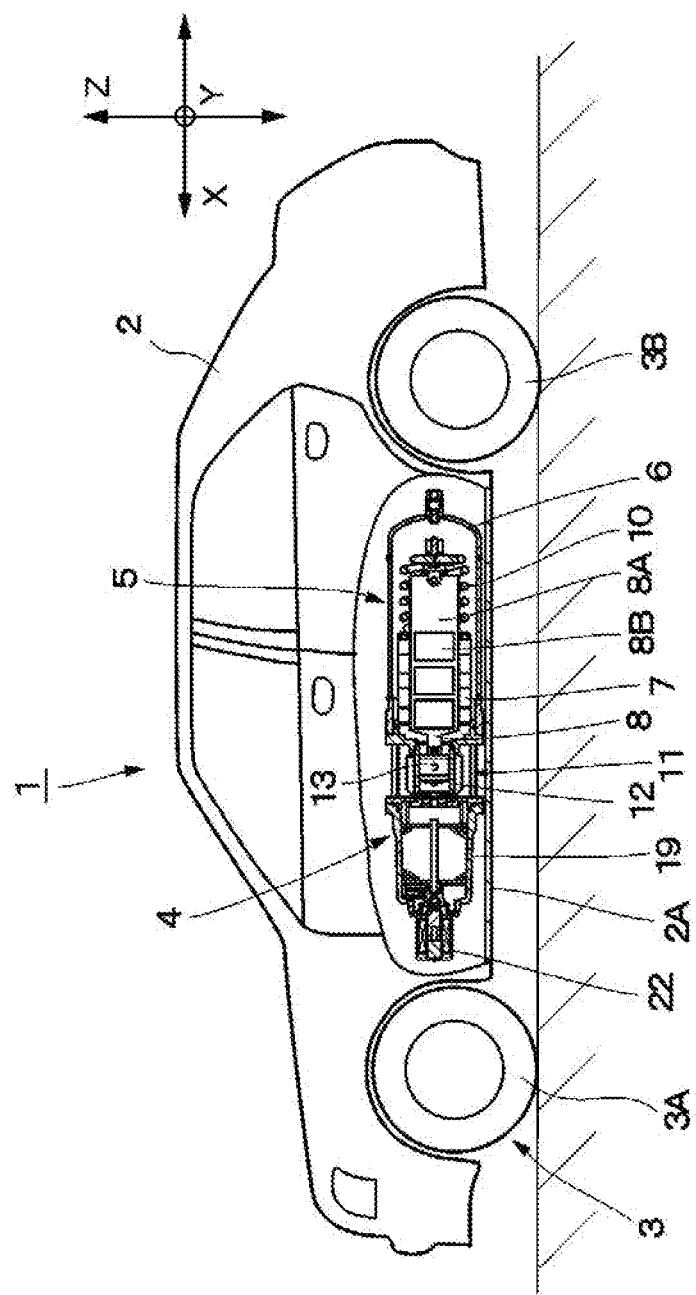
FIG. 1 is a partly broken front view illustrating a linear motor compressor mounted on a four-wheeled vehicle according to a first embodiment.

FIGS. 1 to 5 illustrate a first embodiment. As shown in FIG. 1, a vehicle 1 as a four-wheeled vehicle includes, for example, a vehicle body 2, wheels 3, a linear motor compressor 4, and air suspensions 26A to 26D described later. The vehicle body 2 forms the body of the vehicle 1. The linear motor compressor 4 is mounted on a floorboard 2A-side of the vehicle body 2 to be placed between, for example, left and right front wheels 3A and left and right rear wheels 3B (collectively called wheels 3).

As shown in FIG. 1, the linear motor compressor 4 is extended in a front-rear direction of the vehicle 1 (i.e., an X-axis direction horizontal to the ground surface) and is placed on the floorboard 2A of the vehicle body 2 via an antivibration mount (not shown) or the like. The linear motor compressor 4 is configured to include a linear motor 5, a compression portion 11 including a cylinder 12 and a piston 13, and an air dryer 19. The linear motor 5 is configured to reciprocate a mover 8 in an axial direction by the flow of electric current through coils 7B of armatures 7 and thereby drive and reciprocate the piston 13 of the compression portion 11 in this direction.

Figure 2:
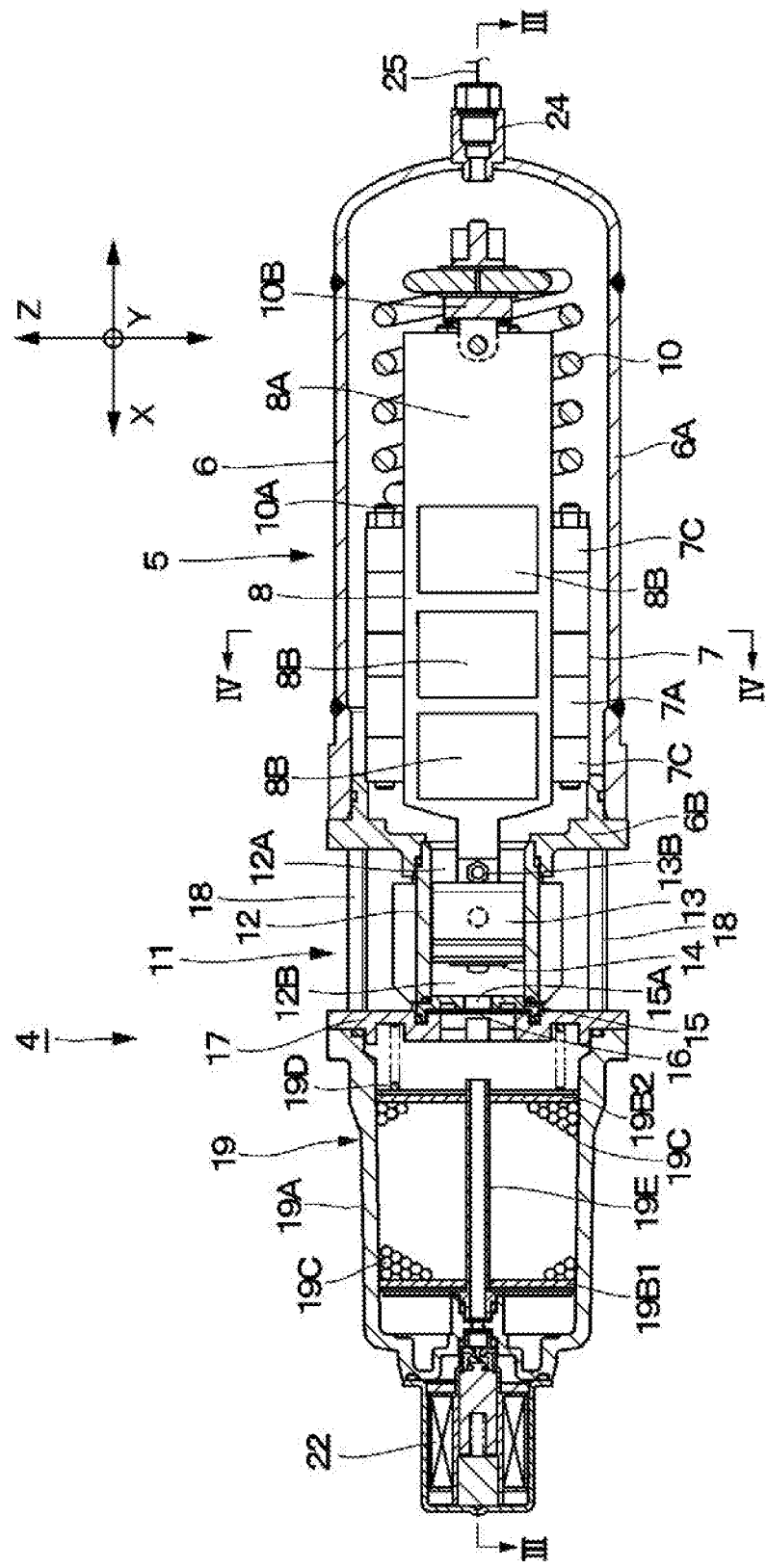
FIG. 2 is an enlarged vertical sectional view illustrating the linear motor compressor shown in FIG. 1.
Figure 3:
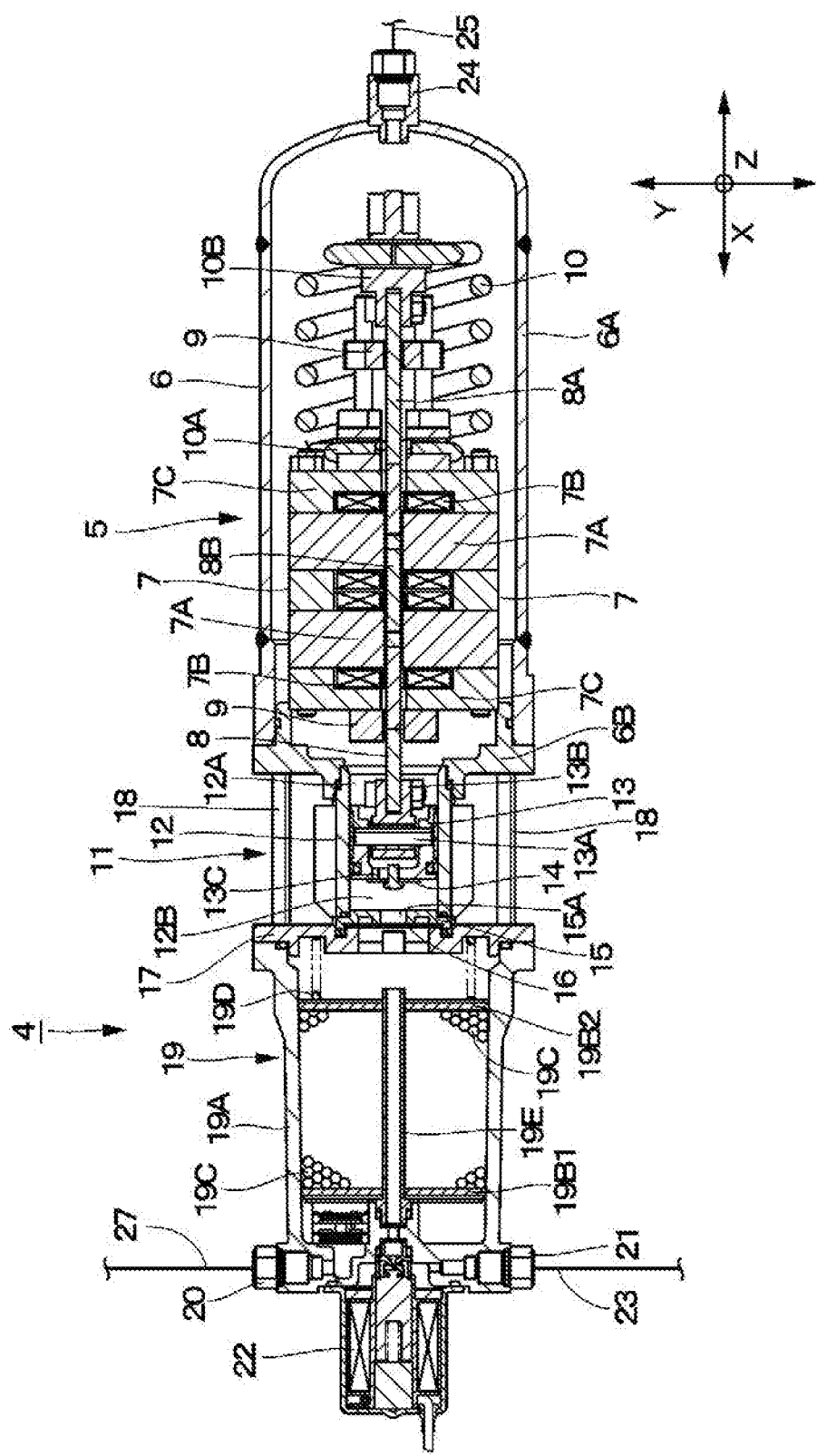
FIG. 3 is a vertical sectional view illustrating the linear motor compressor viewed from the direction of an arrow III-III in FIG. 2.

The linear motor 5 is provided as a driving source of the linear motor compressor 4 (compression portion 11) and is mounted on the floorboard 2 of the vehicle body 2. This linear motor 5 is configured to include a casing 6 that forms the outer shell thereof, as well as the armatures 7, the mover 8, support members 9 and a spring 10 placed inside of the casing 6 as described later. As shown in FIGS. 2 and 3, the casing 6 of the linear motor 5 includes a motor case 6A and a linear base 6B.

The motor case 6A is formed as a bottomed cylindrical hollow vessel having one end side (front side of the vehicle 1) that is open and the other end side (rear side of the vehicle 1) that is closed. The armatures 7, the mover 8, the support members 9 and the spring 10 are placed inside of the motor case 6A. The linear base 6B is provided on one end side of the motor case 6A so as to close its open end. The linear base 6B is fastened to the open end side of the motor case 6A by screw clamping or other means. The linear base 6B forms a mounting member used to detachably fix (mount) the cylinder 12 of the compression portion 11 to the motor case 6A-side.

A pair of the armatures 7 and the flat plate mover 8 are provided in the motor case 6A of the linear motor 5. The pair of armatures 7 are provided to place the mover 8 therebetween along a left-right direction of the vehicle 1 (Y-axis direction shown in FIG. 3) and form a stator fixed inside of the motor case 6A. Each of the armatures 7 is formed from, for example, a dust core, layered electromagnetic steel sheets, or a magnetic material piece and includes a plurality of cores 7A arranged at intervals in the X-axis direction shown in FIG. 3 (the front-rear direction of the vehicle 1), a plurality of coils 7B wound on the respective cores 7A, and a plurality of holding bodies 7C configured to hold these cores 7A and the coils 7B in a preassembled state.

The mover 8 is formed as a rectangular flat plate body that is placed between the pair of armatures 7 and that is extended in an axial direction of the motor case 6A (X-axis direction shown in FIG. 2 and the front-rear direction of the vehicle 1). Accordingly, the mover 8 is extended in the axial direction (X-axis direction) in the motor case 6A along a center axis of the linear motor 5, and the pair of armatures 7 are placed on both the left side and the right side of the mover 8. The mover 8 includes a yoke 8A formed from a magnetic material in a flat plate shape and a plurality of flat plate permanent magnets 8B placed on a surface and a rear face of the yoke 8A. As shown in FIG. 2, the permanent magnets 8B are formed as rectangular plates. A total of three permanent magnets 8B are arranged at intervals in the longitudinal direction of the mover 8 (X-axis direction).

The respective cores 7A of the armatures 7 have end surfaces that face the mover 8 in the Y-axis direction shown in FIG. 3 (left-right direction) and that serve as magnetic poles 7D (shown in FIG. 4) and are excited by electric conduction to the respective coils 7B. The electric conduction to the respective coils 7B of the armatures 7 generates magnetic attraction and repulsion between the respective cores 7A of the armatures 7 and the respective permanent magnets 8B of the mover 8. Accordingly, the flat plate mover 8 is driven to repeatedly reciprocate in the longitudinal direction (X-axis direction) between the pair of armatures 7 in the motor case 6A.

Figure 4:
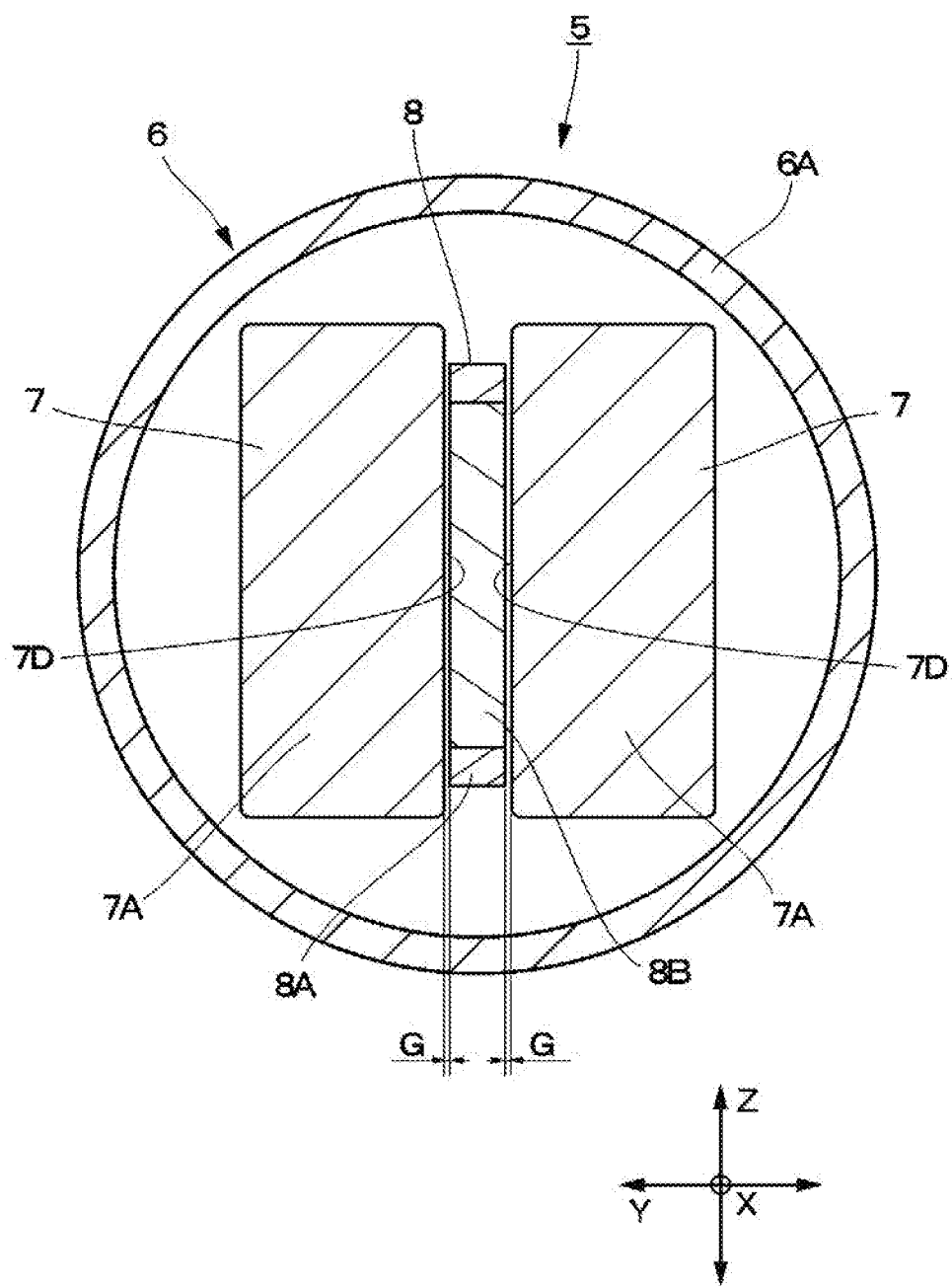
FIG. 4 is a sectional view illustrating armatures and a mover of the linear motor compressor viewed from the direction of an arrow IV-IV in FIG. 2.

As shown in FIG. 2, the casing 6 (motor case 6A) of the linear motor 5 is arranged such that the longitudinal direction of the mover 8 formed in the flat plate shape is the X-axis direction and that the plate width direction of the mover 8 is a Z-axis direction orthogonal to a horizontal plane. The plate thickness direction of the mover 8 is a Y-axis direction that is orthogonal to the X axis and the Z axis. In other words, the mover 8 is formed from a rectangular flat plate body that is elongated and has a predetermined plate thickness. The pair of armatures 7 are arranged such that the mover 8 is placed therebetween in the plate thickness direction (Y-axis direction) as shown in FIG. 4. Small magnetic gaps G are formed in the left-right direction of the vehicle 1 (Y-axis direction) between the respective armatures 7 and the mover 8.

As shown in FIG. 3, multiple sets of paired support members 9 serving as slide bearings are provided between the armatures 7 and the mover 8 to be arranged at intervals, for example, in a front-rear direction of the armatures 7 (X-axis direction). The support members 9 of each pair are mounted to the holding bodies 7C of the respective armatures 7 to be arranged on the respective sides in the left-right direction (Y-axis direction) of the mover 8 and slidably support the mover 8 such that the mover 8 moves in the longitudinal direction (X-axis direction).

The spring 10 is an assist spring located on the other side (rear side) of the linear motor 5 and provided in the motor case 6A. The spring 10 has one end side that is fixed to the other end (rear end) side of the armatures 7 by means of connectors 10A and the other end side that is mounted to the other end (rear end) side of the mover 8 by means of a connector 10B to be movable in the axial direction. The spring 10 is configured by, for example, a compression coil spring and serves to continuously bias the mover 8 toward the other end (closed end) side of the motor case 6A. As the mover 8 reciprocates in the X-axis direction, the spring 10 is elastically bent and deformed to be stretched and contracted in the axial direction.

As described above, the linear motor 5 according to the first embodiment is configured to include the tubular casing 6; the armatures 7 fixed and arranged inside of the casing 6; the mover 8 formed in the flat plate shape and arranged to face the armatures 7 and to be movable in the casing 6; the plurality of permanent magnets 8B placed on the mover 8 to be arranged at intervals in the longitudinal direction of the mover 8; the plurality of magnetic poles 7D arranged on the armatures 7 such that the mover 8 moves in the longitudinal direction relative to the armatures 7 (as shown in FIG. 4); and the plurality of support members 9 provided between the armatures 7 and the mover 8 to slidably support the mover 8 such that the mover 8 moves in the longitudinal direction.

The casing 6 (motor case 6A) of the linear motor 5 is mounted on the vehicle 1 such that the moving direction of the mover 8 (the longitudinal direction of the mover 8) is the horizontal direction. The respective armatures 7 and the mover 8 are arranged to face each other across the magnetic gaps G in the left-right direction that is the horizontal direction of the vehicle 1 (Y-axis direction shown in FIG. 4). Accordingly, the longitudinal direction of the mover 8 is the X-axis direction, and the plate width direction of the mover 8 is the Z-axis direction orthogonal to the horizontal plane. The plate thickness direction of the mover 8 is the Y-axis direction that is orthogonal to the X axis and the Z axis.

The compression portion 11 of the linear motor compressor 4 is provided to be placed between the linear motor 5 and the air dryer 19. The compression portion 11 is configured to include, for example, the cylinder 12, the piston 13, an intake valve 14, a valve plate 15, a cylinder head 17 and a discharge valve 16. In this compression portion 11, the piston 13 is driven to reciprocate forward and backward in the X-axis direction accompanied with reciprocation of the mover 8 of the linear motor 5. Accordingly, the compression portion 11 compresses the air (outside air) in a compression chamber 12B to generate the compressed air (i.e., operating gas).

The cylinder 12 has one end side (front side in the X-axis direction) that is closed by the valve plate 15 and the other end side (rear side in the X-axis direction) that is fixed and mounted to the linear base 6B. The cylinder 12 is formed from, for example, an aluminum material, in a cylindrical shape, and the piston 13 is inserted in the cylinder 12 to be reciprocable (slidable). As shown in FIG. 2 and FIG. 3, inside of the cylinder 12 is divided by the piston 13 into a non-compression chamber 12A that continuously communicates with inside of the motor case 6A and the compression chamber 12B on the cylinder head 17-side.

The piston 13 is slidably inserted in the cylinder 12. This piston 13 forms a movable partition wall that divides inside of the cylinder 12 into the non-compression chamber 12A and the compression chamber 12B. The piston 13 is coupled with the mover 8 of the linear motor 5 to be rotatable via a piston pin 13A and a connector 13B. Accordingly, the piston 13 is provided to be slid and displaced in the axis direction of the linear motor 5 (motor case 6A), i.e., in the X-axis direction and to reciprocate in the cylinder 12 in conjunction with reciprocation of the mover 8. In other words, the piston 13 is placed on the axis in the moving direction (X axis) of the mover 8 of the linear motor 5.

The piston 13 includes a communication hole 13C (shown in FIG. 3) arranged to cause the non-compression chamber 12A and the compression chamber 12B to communicate with each other, and the intake valve 14 covering the communication hole 13C in an openable and closable manner. This intake valve 14 opens the communication hole 13C in an intake stroke of the compression portion 11 (piston 13), so as to cause the non-compression chamber 12A and the compression chamber 12B to communicate with each other. In a compression stroke of the compression portion 11 (piston 13), the intake valve 14 closes the communication hole 13C, so that the compression chamber 12B is blocked from the non-compression chamber 12A.

The valve plate 15 is provided on one end side of the cylinder 12 such as to close one end of the cylinder 12. The valve plate 15 includes a discharge hole 15A arranged to continuously communicate with the compression chamber 12B of the cylinder 12, and the discharge valve 16 covering the discharge hole 15A in an openable and closable manner. The discharge valve 16 closes the discharge hole 15A in the intake stroke of the compression chamber 11 to block the compression chamber 12B from the air dryer 19-side and opens the discharge hole 15A in the compression stroke to cause inside of the compression chamber 12B to communicate with the air dryer 19.

The cylinder head 17 is placed on one end side of the cylinder 12 such as to close one end of the cylinder 12, in combination with the valve plate 15. The cylinder head 17 is provided to be fit on the other side of the air dryer 19 as a discharge portion to discharge the compressed air and closes the opening on the other side of the air dryer 19. A plurality of fixtures 18 are provided between the cylinder head 17 and the linear base 6B to link and fix the cylinder head 17 and the linear base 6B with and to each other. These fixtures 18 are placed between the cylinder head 17 and the linear base 6B to be arranged at intervals in the circumferential direction radially outside the cylinder 12.

The air dryer 19 is located on one end side (front side) of the compression portion 11 and is provided on the opposite side to the linear motor 5 across the compression portion 11. The air dryer 19 is arranged in series with the piston 13 such that its axis direction is along the axis (X axis) direction of the piston 13. Accordingly, the axis of the air dryer 19 and the axis of the cylinder 12 (piston 13) are approximately aligned with each other and are extended in the X-axis direction. In other words, the air dryer 19 is placed on the axis (X axis) in the moving direction of the mover 8 of the linear motor 5 and the piston 13. This configuration reduces the dimension in the radial direction of the linear motor compressor 4 and enhances the vehicle mountability of the compressor.

The air dryer 19 is configured to include, for example, a dryer caser 19A configured to form its outer shell, filters 19B1 and 19B2 provided in the dryer case 19A, a desiccant 19C, a spring 19D and an exhaust pipe 19E. The air dryer 19 serves to dry the compressed air that is to be supplied from the compression portion 11 toward the air suspensions 26A to 26D described later and to keep the inside of a supply/discharge conduit 27 and the air suspensions 26A to 26D described later in the dry condition.

The dryer case 19A of the air dryer 19 is formed from a metal material such as an aluminum material as a bottomed cylindrical hollow vessel having one end side that is closed and the other end side that is open. The cylinder head 17 is fit on the other end side of the dryer case 19A to close the opening end of the dryer case 19A. The inside of the dryer case 19A is filled with a large number of particles of the desiccant 19C placed between the filters 19B1 and 19B2 arranged away from each other in the front-rear direction. These filters 19B1 and 19B2 prevent part of the desiccant 19C from flowing outside. The spring 19D is provided between the filter 19B2 and the cylinder head 17 to continuously bias the filter 19B2 in a direction away from the cylinder head 17 (forward in the X-axis direction), in order to suppress the respective particles of the desiccant 19C from rattling and shaking between the filters 19B1 and 19B2.

The exhaust pipe 19E is provided between the filters 19B1 and 19B2 to pierce the filters 19B1 and 19B2 and to cause the front side and the rear side of the air dryer 19 to communicate with each other. One end side (front side) of the exhaust pipe 19E is in communication with an exhaust port 21 via an exhaust valve 22 described later, and the other end side (rear side) of the exhaust pipe 19E is in communication with a space between the filter 19B2 and the cylinder head 17. The exhaust pipe 19E is provided to flow the compressed air in the non-dry condition (the compressed air without adsorption of water by the desiccant 19C, for example, the compressed air in the wet condition) toward the exhaust port 21 to be discharged to the outside atmosphere.

A supply/discharge port 20 is located on one end side of the air dryer 19 (front side in the X-axis direction) and is provided on the bottom side of the dryer case 19A. This supply/discharge port 20 is a port connected with the supply/discharge conduit 27 described later to supply and discharge the compressed air between the air dryer 19 and the air suspensions 26A to 26D. The compressed air discharged from the compression chamber 12B of the cylinder 12 is dried by the air dryer 19 and is individually and independently supplied from the supply/discharge port 20 toward the air suspensions 26A to 26D.

The compressed air in the dry condition discharged from the air suspensions 26A to 26D is guided from the supply/discharge port 20 into the dryer case 19A of the air dryer 19 and is discharged through the exhaust pipe 19E and the exhaust port 21 to the outside. The compressed air in the dry condition takes the water adsorbed by the desiccant 19C to regenerate the desiccant 19C during the reverse flow in the air dryer 19 and is then discharged from the exhaust port 21.

The exhaust port 21 is placed at a different position in the circumferential direction from the position of the supply/discharge port 20, on the bottom side of the dryer case 19A and is provided on one end side of the air dryer 19 (front side in the X-axis direction). This exhaust port 21 is connected with an exhaust conduit 23 to discharge the compressed air from the exhaust pipe 19E toward the outside. The exhaust valve 22 is provided between the exhaust port 21 and the exhaust pipe 19E.

Figure 5:
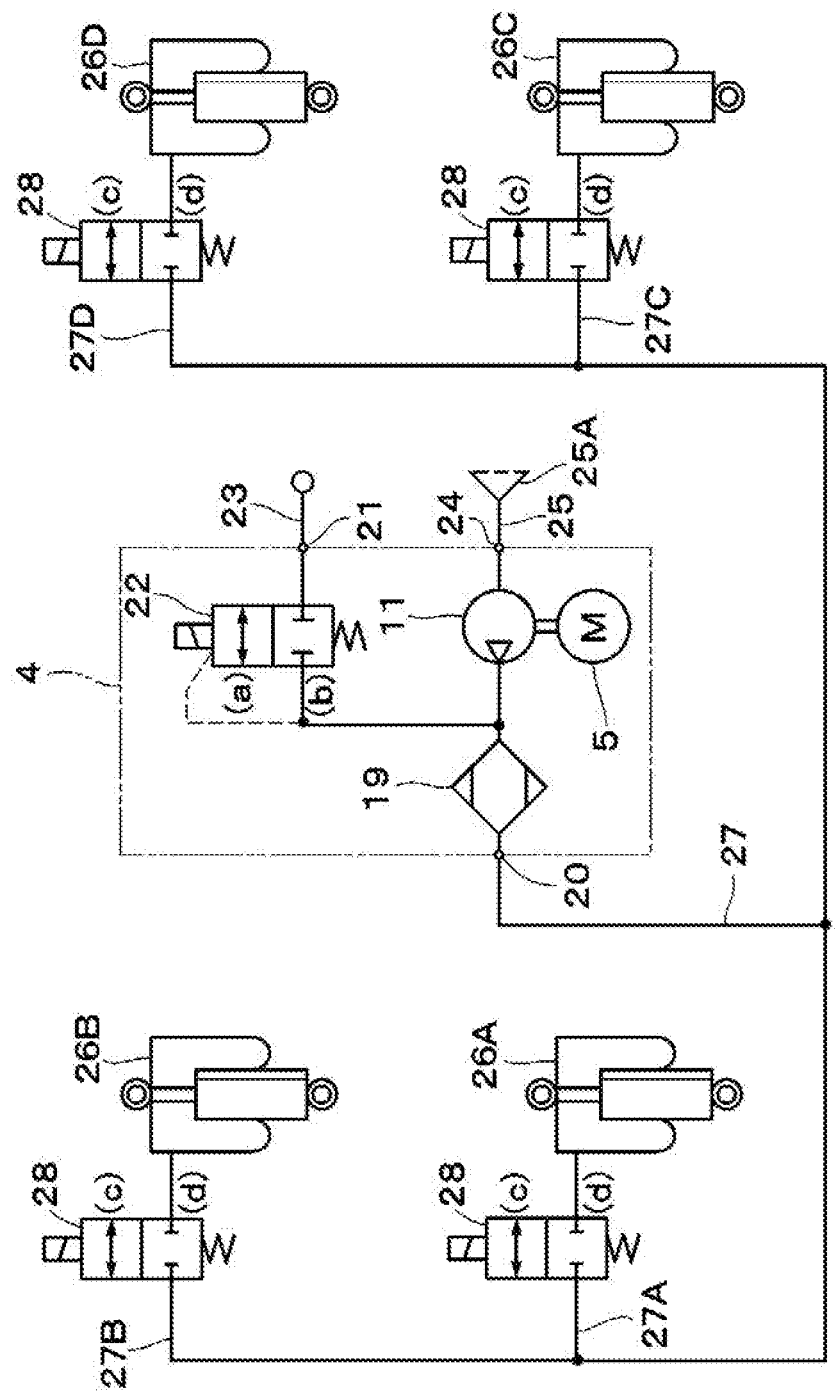
FIG. 5 is a pneumatic pressure circuit diagram for adjustment of the vehicle height using the linear motor compressor.

This exhaust valve 22 is a valve configured to cause the exhaust port 21 connected with the exhaust conduit 23 to communicate with and to be blocked from the atmosphere (outside air). As shown in FIG. 5, the exhaust valve 22 is configured by an ON/OFF-type (open-close type) solenoid valve and is selectively changed over to an open position (a) to open the exhaust port 21 and allow the compressed air to be discharged from the exhaust pipe 19E or to a closed position (b) to close the exhaust port 21 and stop (block) the discharge of the compressed air from the exhaust pipe 19E. Accordingly, the exhaust valve 22 is normally closed to block the exhaust pipe 19E from the exhaust port 21. When the exhaust valve 22 is opened, the exhaust pipe 19E communicates with the exhaust port 21, so that the compressed air in the exhaust pipe 19E is discharged (released) through the exhaust port 21 and the exhaust conduit 23 to the atmosphere.

The exhaust conduit 23 is provided to connect with the exhaust port 21 of the air dryer 19. This exhaust conduit 23 normally communicates with the atmosphere and causes the exhaust pipe 19E in the air dryer 19 and the exhaust port 21 to communicate with each other via the exhaust valve 22 when the exhaust valve 22 is changed over from the closed position (b) to the open position (a) to be opened. Accordingly, the compressed air in the exhaust pipe 19E is discharged (released) from the exhaust conduit 23 via the exhaust valve 22 to the atmosphere.

A suction port 24 of the air is provided on the bottom side of the motor case 6A to be placed on the other end side (rear side) of the linear motor 5. This suction port 24 serves to suck the air from the outside into the compression chamber 12B through an internal space of the motor case 6A, the non-compression chamber 12A in the cylinder 12 and the intake valve 14 in the intake stroke of the compression portion 11. The suction port 24 is connected with an intake conduit 25 outside of the motor case 6A. The intake conduit 25 is connected with the intake side of the compression portion 11 via the suction port 24. This intake conduit 25 normally communicates with the atmosphere to flow the intake air from an intake filter 25A into the compression portion 11.

The following describes an example of application of the linear motor compressor 4 according to the first embodiment to an air suspension device of the vehicle 1 such as a four-wheeled vehicle with reference to FIG. 5. This air suspension device is configured to include, for example, the linear motor compressor 4, the air suspensions 26A to 26D, the supply/discharge conduit 27 and a plurality of supply/discharge valves 28.

The air suspensions 26A to 26D serve as air springs and form a pneumatic equipment. The air suspensions 26A and 26B are placed on the left and right front wheels 3A-side and are provided between the left and right front wheels 3A and the vehicle body 2. The air suspensions 26C and 26D are placed on the left and right rear wheels 3B-side and are provided between the left and right rear wheels 3B and the vehicle body 2. The air suspensions 26A to 26D form a vehicle height adjustment device configured to support the vehicle body 2 to be movable in a vertical direction. Accordingly, when the compressed air from the linear motor compressor 4 is supplied to or discharged from the air suspensions 26A to 26D, the air suspensions 26A to 26D are vertically expanded or contracted according to the supply or discharge amount (amount of the compressed air) at this time, so as to adjust the vehicle height of the vehicle 1. These air suspensions 26A to 26D are connected with the compression portion 11 of the linear motor compressor 4 via the supply/discharge conduit 27.

The supply/discharge conduit 27 has one end that is connected with the supply/discharge port 20 of the linear motor compressor 4 (compression portion 11) and the other end that is branched off to, for example, four branch pipes 27A to 27D. These branch pipes 27A to 27D are respectively connected with the air suspensions 26A to 26D via the supply/discharge valves 28. The branch pipes 27A to 27D of the supply/discharge conduit 27 serve to supply and discharge the compressed air to and from the air suspensions 26A to 26D.

A total of four supply/discharge valves 28 are placed between the air suspensions 26A to 26D and the compression portion 11 and are provided in the middle of the respective branch pipes 27A to 27D. Approximately like the exhaust valve 22, these supply/discharge valves 28 are configured by ON/OFF-type solenoid valves. The respective supply/discharge valves 28 are selectively changed over to an open position (c) to individually and independently open the branch pipes 27A to 27D and allow the compressed air to be supplied to and discharged from the air suspensions 26A to 26D or to a closed position (d) to individually and independently close the branch pipes 27A to 27D and block the supply and discharge of the compressed air to and from the air suspensions 26A and 26D.

The following describes the operations of the linear motor compressor 4 according to the first embodiment having the configuration described above.

When electric current is supplied (electricity is conducted) to the coils 7B of the armatures 7 of the linear motor 5, the permanent magnets 8B of the mover 8 receive a thrust force in the axial direction, so that the entire mover 8 is driven toward the front-rear direction of the vehicle 1 (X-axis direction). In this state, the electric conduction to the respective coils 7B of the armatures 7 generates magnetic attraction and repulsion between the respective cores 7 of the armatures 7 and the respective permanent magnets 8B of the mover 8. Accordingly, the flat plate mover 8 is driven to repeatedly reciprocate in the longitudinal direction (X-axis direction) between the pair of armatures 7 in the motor case 6A.

The thrust force accompanied with reciprocation of the mover 8 is transmitted to the piston 13 in the compression chamber 11 (cylinder 12) via the connector 13B. The piston 13 repeatedly reciprocates in the axial direction in the cylinder 12 to perform a compression movement. Accordingly, in the intake stroke of the piston 13, the compression chamber 12B in the cylinder 12 tends to have a negative pressure, so that the intake valve 14 is opened. This causes the non-compression chamber 12A and the compression chamber 12B to communicate with each other via the communication hole 13C provided in the piston 13. The outside air accordingly flows from the suction port 24 of the motor case 6A through inside of the motor case 6A into the non-compression chamber 12A in the cylinder 12. This air is sucked into the compression chamber 12B via the communication hole 13C of the piston 13.

In the compression stroke of the piston 13, on the other hand, in the state that the intake valve 14 is closed to block the communication hole 13C of the piston 13, the pressure in the compression chamber 12B is increased by the displacement of the piston 13 in the cylinder 12. When the pressure in the compression chamber 12B becomes higher than a valve-opening pressure of the discharge valve 16, the discharge valve 16 is opened. This causes the compressed air produced in the compression chamber 12B to be discharged through the cylinder head 17 toward inside of the air dryer 19. The air dryer 19 causes the compressed air to be exposed to the desiccant 19C and thereby adsorbs and removes the water. The dried compressed air is supplied through the supply/discharge port 20 and the supply/discharge conduit 27 to the left and right air suspensions 26A and 26B on the front wheel side and to the left and right air suspensions 26C and 26D on the rear wheel side.

In the case where the compressed air is supplied to the air suspensions 26A to 26D to raise the vehicle height of the vehicle body 2, the respective supply/discharge valves 28 provided in the middle of the branch pipes 27A to 27D are changed over from the closed position (d) to the open position (c). Operating the linear motor compressor 4 (compression portion 11) in this state causes the compressed air produced in the compression portion 11 to be supplied through the branch pipes 27A to 27D of the supply/discharge conduit 27 to the air suspensions 26A to 26D on both the front wheel side and the rear wheel side.

When the vehicle height on the vehicle body 2-side reaches a target height, in order to complete the operation of raising the vehicle height, the respective supply/discharge valves 28 are returned to the closed position (d) to close the branch pipes 27A to 27D. This stops the supply of the compressed air to the air suspensions 26A to 26D on both the front wheel side and the rear wheel side. The air suspensions 26A to 26D are then kept in the stretched state, so that the vehicle height on the vehicle body 2-side is kept at the target height.

In the case where the vehicle height is to be lowered, on the other hand, the respective supply/discharge valves 28 in the middle of the respective branch pipes 27A to 27D are changed over to the open position (c), and the exhaust valve 22 of the linear motor compressor 4 is changed over from the closed position (b) to the open position (a). This discharges the compressed air in the air suspensions 26A to 26D through the branch pipes 27A to 27D of the supply/discharge conduit 27 into the air dryer 19.

In this state, the compressed air reversely flows in the air dryer 19 and takes the water adsorbed by the desiccant 19C to regenerate the desiccant 19C. The compressed air is then discharged (released) through the exhaust pipe 19E, the exhaust valve 22, the exhaust port 21, and the exhaust conduit 23 to the outside. As a result, compressed air is discharged from the air suspensions 26A to 26D to contract the air suspensions 26A to 26D and thereby lower the vehicle height.

When the mover 8 of the linear motor 5 is formed in a flat plate shape and the linear motor compressor 4 (linear motor 5) is placed to be horizontally laid on the floorboard 2A of the vehicle 1, the flat plate mover 8 may be arranged to face the armatures 7 in the vertical direction. Vibrations generated in the vehicle 1 include, for example, vibration in the vertical direction and vibration in the left-right direction or in the front-rear direction. Out of them, the vibration in the vertical direction is the largest vibration. Accordingly, transmission of the vibration in the vertical direction of the vehicle 1 to the linear motor 5 causes the mover 8 and the armatures 7, which face each other in the vertical direction, to become closer to each other and farther away from each other and is likely to reduce the durability and the life duration of the support members 9 provided between the armatures 7 and the mover 8.

In view of the foregoing, according to the first embodiment, the casing 6 (motor case 6A) of the linear motor 5 is mounted on the vehicle 1 such that the moving direction of the mover 8 (longitudinal direction of the mover 8) is the horizontal direction, and the respective armatures 7 and the mover 8 are arranged to face each other across the magnetic gaps G in the left-right direction that is the horizontal direction of the vehicle 1 (Y-axis direction shown in FIG. 4). Accordingly, the longitudinal direction of the mover 8 is the X-axis direction, and the plate width direction of the mover 8 is the Z-axis direction orthogonal to the horizontal plane. The plate thickness direction of the mover 8 is the Y-axis direction that is orthogonal to the X axis and the Z axis.

Even when the vibration in the vertical direction as the largest vibration out of the vibrations of the vehicle 1 is transmitted to the linear motor 5, this configuration suppresses the armatures 7 and the mover 8, which face each other across the magnetic gaps G in the left-right direction (Y-axis direction shown in FIG. 4), from becoming closer to each other and farther away from each other due to the vibration in the vertical direction. This configuration also suppresses the vibration in the vertical direction from adversely affecting the support members 9 provided between the armatures 7 and the mover 8.

Especially, the flat plate mover 8 has low rigidity in the plate thickness direction and is likely to be deformed. The mover 8, on the other hand, has high rigidity in the plate width direction (Z-axis direction). This configuration thus assures the strength of the mover 8 relative to the vibration in the vertical direction of the vehicle 1 (Z-axis direction) and enhances the durability and the life duration of the armatures 7, the mover 8 and the support members 9. As a result, this suppresses deterioration of the performance of the linear motor 5 (linear motor compressor 4) due to the vertical vibration of the vehicle body 2.

Accordingly, even when the vibration in the vertical direction, i.e., the vertical acceleration, of the vehicle 1 (vehicle body 2) is transmitted to the linear motor 5 (linear motor compressor 4), the configuration of the first embodiment suppresses the armatures 7 and the mover 8 from vibrating to become closer to each other and farther away from each other and improves the durability and the life duration of the linear motor 5. This configuration also suppresses a variation in thrust force caused by approach and separation between the armatures 7 and the mover 8.

According to the first embodiment described above, the linear motor compressor 4 (linear motor 5) is mounted on the vehicle 1 such that the linear motor compressor 4 extends in the front-rear direction of the vehicle 1 and the armatures 7 and the mover 8 face each other in the left-right direction of the vehicle 1 as shown in FIG. 1. The present invention is, however, not limited to this configuration. The mounting direction of the linear motor 5 is not limited to the direction shown in FIG. 1 (front-rear direction of the vehicle 1) but may be changed to another direction that is horizontal to the ground surface.

In the case where the linear motor compressor 4 (linear motor 5) is mounted on the vehicle 1, the front-rear direction of the vehicle 1 (X-axis direction) is not necessarily limited to the exact front-rear direction but may include the case of inclination in the horizontal direction by a predetermined angle to the X-axis direction shown in FIG. 1. The angle of inclination is preferably within about ±30 degrees and is more preferably within about ±10 degrees.

Figure 6:
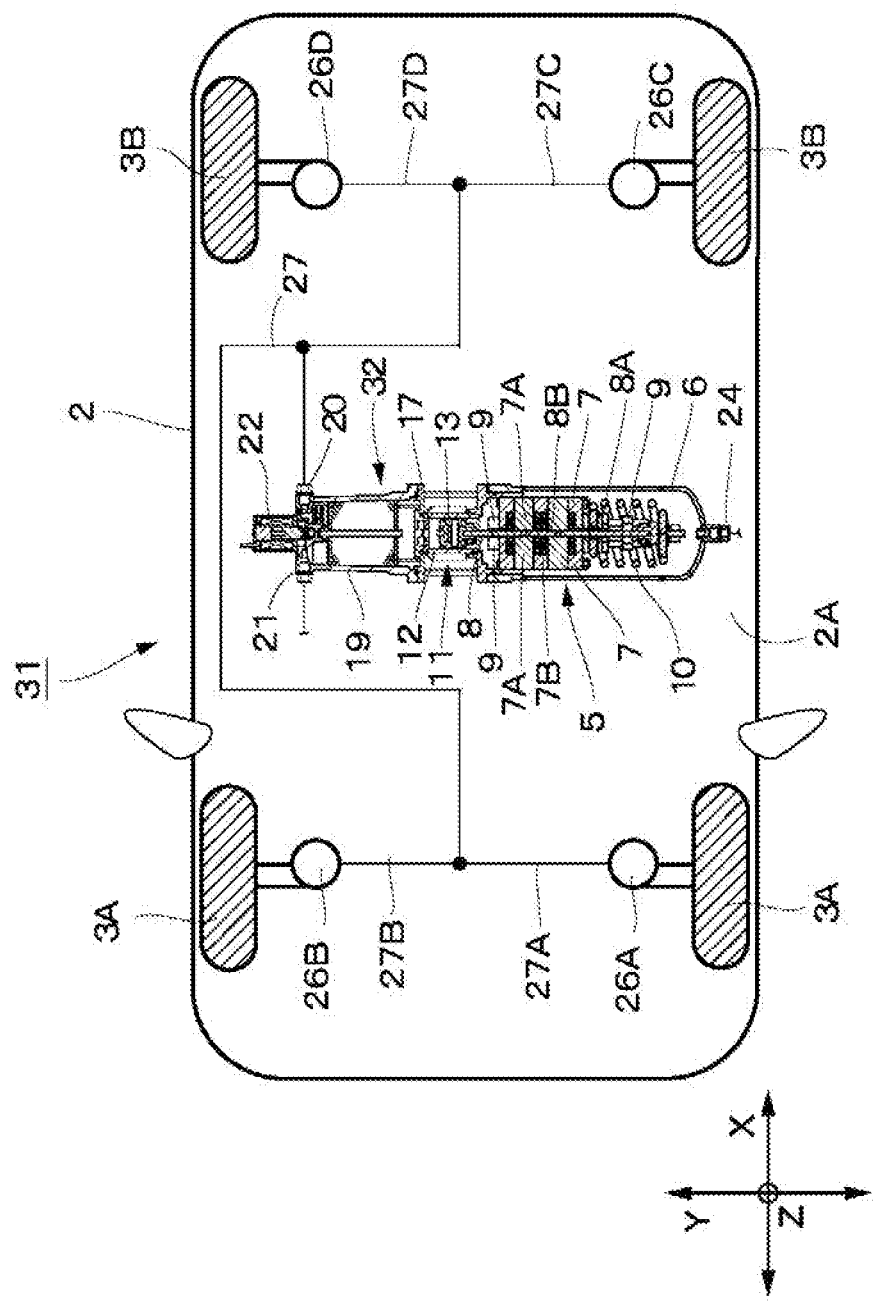
FIG. 6 is a sectional view illustrating a linear motor compressor mounted on a vehicle viewed downward according to a second embodiment.

FIG. 6 illustrates a second embodiment. This embodiment is characterized by a configuration that a linear motor compressor mounted on a vehicle is arranged to be extended in the left-right direction of the vehicle. Components of the second embodiment similar to those of the first embodiment described above are expressed by similar reference signs, and their description is omitted.

A vehicle 31 as a four-wheeled vehicle has a similar configuration to that of the vehicle 1 described in the first embodiment and includes, for example, a vehicle body 2, wheels 3, air suspensions 26A to 26D and a linear motor compressor 32. The linear motor compressor 32 is mounted on a floorboard 2A-side of the vehicle body 2 to be located, for example, between left and right front wheels 3A and left and right rear wheels 3B (hereinafter collectively called wheels 3).

The linear motor compressor 32 has a similar configuration to that of the linear motor compressor 4 described in the first embodiment and is configured to include, for example, a linear motor 5, a compression portion 11 having a cylinder 12 and a piston 13, and an air dryer 19. As shown in FIG. 6, however, the linear motor compressor 32 according to the second embodiment is extended in a left-right direction of the vehicle 31 (i.e., a Y-axis direction horizontal to the ground surface) and is placed on the floorboard 2A of the vehicle body 2 via an antivibration mount (not shown) or the like.

Accordingly, the casing 6 of the linear motor 5 is arranged such that the plate thickness direction of a mover 8 formed in the flat plate shape is a front-rear direction of the vehicle 31 (X-axis direction). The longitudinal direction of the mover 8 is the left-right direction (Y-axis direction), and the plate width direction of the mover 8 is a Z-axis direction orthogonal to the horizontal plane. A pair of armatures 7 are arranged such that the mover 8 is placed therebetween in the plate thickness direction (X-axis direction) as shown in FIG. 6. Small magnetic gaps (not shown) are formed in the front-rear direction of the vehicle 31 (X-axis direction) between the respective armatures 7 and the mover 8.

Even when the vibration in the vertical direction as the largest vibration among the vibrations of the vehicle 31 are transmitted to the linear motor 5, the above configuration of the second embodiment also suppresses the armatures 7 and the mover 8, which face each other in the front-rear direction of the vehicle 31 (X-axis direction), from becoming closer to each other and farther away from each other due to the vibration in the vertical direction. This accordingly has approximately similar functions and advantageous effects to those of the first embodiment.

According to the second embodiment described above, the linear motor compressor 32 (linear motor 5) is mounted on the vehicle 31 such that the linear motor compressor 32 is extended in the left-right direction of the vehicle 31 and that the armatures 7 and the mover 8 face each other in the front-rear direction of the vehicle 31 as shown in FIG. 6. The present invention is, however, not limited to this configuration. The mounting direction of the linear motor 5 is not limited to the Y-axis direction shown in FIG. 6 (left-right direction of the vehicle 31), but may be changed to another direction that is horizontal to the ground surface.

In the case where the linear motor compressor 32 (linear motor 5) is mounted on the vehicle 31, the left-right direction of the vehicle 31 (Y-axis direction) is not necessarily limited to the exact left-right direction, but may include the case of inclination in the horizontal direction by a predetermined angle to the Y-axis direction shown in FIG. 6. The angle of inclination is preferably within about ±30 degrees and is more preferably within about ±10 degrees.

According to the first embodiment described above, the linear motor compressor 4 is employed for the open-type air suspension device configured to discharge the compressed air to the outside without using a reservoir tank of the compressed air. The present invention is, however, not limited to this configuration. For example, the linear motor compressor 4 may be employed for a closed-type air suspension device. The same applies to the second embodiment.

According to the first embodiment described above, the linear motor 5, the compression portion 11 and the air dryer 19 are arranged such that the respective center axes of the linear motor 5, the compression portion 11 and the air dryer 19 are aligned. The present invention is, however, not limited to this configuration and may not exclude, for example, a configuration that the center axis of the compressor and the center axis of the air dryer are slightly offset from the center axis of the linear motor. Further, the center axis of the linear motor and the center axis of the air dryer may be offset from the center axis of the compressor, or the center axis of the linear motor and the center axis of the compressor may be offset from the center axis of the air dryer. The same applies to the second embodiment.

The vehicle linear motor included in the above embodiments may be implemented by any of the following aspects.

According to a first aspect, a vehicle linear motor includes: a tubular casing; a pair of armatures placed and fixed in the casing; a mover formed in a flat plate shape and placed to face the pair of armatures and be movable in the casing; and a support member configured to slidably support the mover such that the mover moves in a longitudinal direction of the mover. The mover formed in the flat plate shape includes a plurality of magnets that are arranged at intervals in the longitudinal direction. Each of the pair of armatures has a magnetic pole that is arranged to move the mover relative to the armatures in the longitudinal direction. The casing is mounted on a vehicle such that the longitudinal direction is a horizontal direction, and the mover and the armatures are placed to face each other in the horizontal direction.

In a second aspect of the vehicle linear motor according to the first aspect, the mover formed in the flat plate shape is placed such that a plate width direction of the mover is a direction orthogonal to a horizontal plane. In a third aspect of the vehicle linear motor according to the first aspect, the pair of armatures are arranged such that the mover is placed therebetween in a left-right direction of the vehicle.

In a fourth aspect of the vehicle linear motor according to the first aspect, the pair of armatures are arranged such that the mover is placed therebetween in a front-rear direction of the vehicle. In a fifth aspect of the vehicle linear motor according to the first aspect, the mover includes a rectangular flat plate body that is elongated and has a plate thickness, the pair of armatures are arranged such that the mover is placed therebetween in a plate thickness direction, and magnetic gaps are formed in either a left-right direction of the vehicle or a front-rear direction of the vehicle between the mover and the pair of armatures.

A sixth aspect of the vehicle linear motor according to any one of the first to the fifth aspects further includes: a compression portion including a piston connected with the mover to reciprocate and a cylinder configured to slidably contain the piston therein and to form a compression chamber; and an air dryer connected with a discharge side of the compression chamber and has inside filled with a desiccant. The air dryer is placed on an axis in a moving direction of the mover and the piston.

The foregoing describes some embodiments of the present invention. Such embodiments of the present invention described above are, however, for the purpose of facilitating the understanding of the present invention and are not intended to limit the present invention. The present invention may be changed, and modified without departing from the spirit of the invention and includes equivalents thereof. In the scope of solving at least part of the problems described above or in the scope of achieving at least part of the advantageous effects, any combination or omission of any of the respective components described in the claims and in the specification hereof may be allowed.

The present application claims priority to Japanese patent application No. 2016-105121 filed on May 26, 2016. The entire disclosure including the specification, the claims, the drawings, and the abstract of Japanese patent application No. 2016-105121 filed on May 26, 2016 is incorporated herein by reference in its entirety.

REFERENCE SIGNS LIST

1, 31 vehicle, 2 vehicle body, 4, 32 linear motor compressor, 5 linear motor, 6 casing, 7 armature, 7D magnetic pole, 8 mover, 8B permanent magnet (magnet), 9 support member, 10 spring, 11 compression portion, 12 cylinder, 13 piston, 17 cylinder head (discharge portion), 19 air dryer, G magnetic gap

The invention claimed is:

1. A vehicle compressor for mounting on a vehicle, the vehicle compressor comprising:
   a tubular casing;
   a pair of armatures placed and fixed in the tubular casing;
   a mover formed in a flat plate shape and placed to face each of the pair of armatures and to be movable in the tubular casing;
   a support member disposed in the tubular casing and configured to slidably support the mover such that the mover moves in a longitudinal direction of the mover;
   a compression portion including a piston connected with the mover and configured to reciprocate and a cylinder configured to slidably contain the piston therein and form a compression chamber; and
   an air dryer connected with a discharge side of the compression chamber and having an inside filled with a desiccant,
   wherein:
   the air dryer is placed on an axis in a moving direction of the mover and the piston;
   the compression portion and the air dryer are arranged such that a center axis of the compression portion and a center axis of the air dryer are aligned;
   the mover includes a plurality of magnets that are arranged at intervals in the longitudinal direction of the mover;
   each of the pair of armatures has a magnetic pole at a position facing the mover;
   the tubular casing is configured to be mounted on the vehicle such that the longitudinal direction of the mover is a horizontal direction of the vehicle; and
   the mover is placed such that a plate width direction of the mover is a direction configured to be orthogonal to a horizontal plane of the vehicle.

2. The vehicle compressor according to claim 1, wherein the pair of armatures are arranged such that the mover is placed therebetween and configured to be in a left-right direction of the vehicle.

3. The vehicle compressor according to claim 1, wherein the pair of armatures are arranged such that the mover is placed therebetween and configured to be in a front-rear direction of the vehicle.

4. The vehicle compressor according to claim 1, wherein:
   the flat plate shape is a rectangular flat plate shape that is elongated and has a plate thickness;
   the pair of armatures are arranged such that the mover is placed therebetween in a plate thickness direction; and
   magnetic gaps are configured to be formed in either a left-right direction of the vehicle or a front-rear direction of the vehicle between the mover and the pair of armatures.

5. The vehicle compressor according to claim 1, wherein the piston includes an intake valve configured to supply air to the compression portion.

6. The vehicle compressor according to claim 1, wherein:
   the mover includes a yoke formed in a flat plate shape and a plurality of flat plate permanent magnets placed on a surface and a rear face of the yoke; and
   the plurality of flat plate permanent magnets are arranged at intervals in the longitudinal direction of the mover.

* * * * *